April 22, 1941.  H. E. POWELL  2,239,015
SUPPORT FOR FOG LIGHTS
Filed Jan. 21, 1939
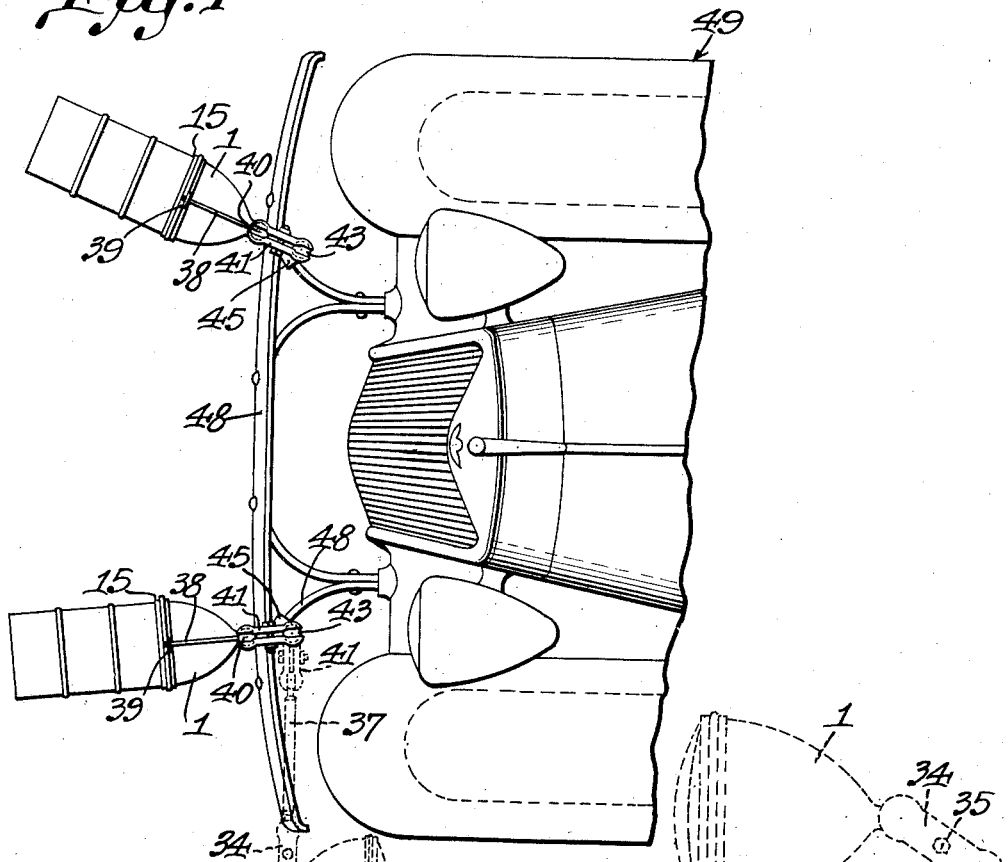
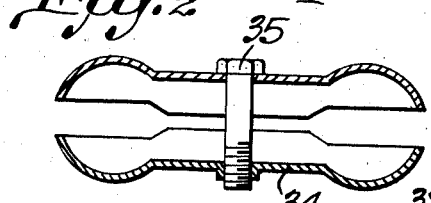
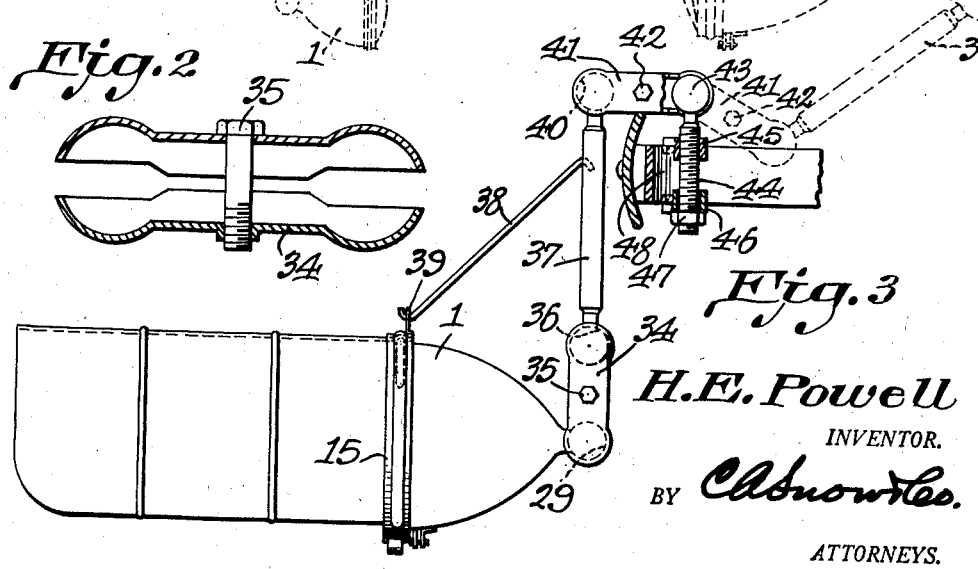
H. E. Powell
INVENTOR.

Patented Apr. 22, 1941

2,239,015

UNITED STATES PATENT OFFICE 2,239,015

SUPPORT FOR FOG LIGHTS

Harry E. Powell, Logansport, Ind.

Application January 21, 1939, Serial No. 252,228

1 Claim. (Cl. 248—276)

This invention aims to provide a new and useful lamp mounting for use on automobiles and similar vehicles, the construction being such that a lamp may be used either above or below the vehicle bumper, and be employed to cast light either backwardly or forwardly.

In the accompanying drawing:

Fig. 1 is a top plan showing a portion of a vehicle whereon the device forming the subject matter of this application has been mounted;

Fig. 2 is a longitudinal section showing one of the clamps;

Fig. 3 is a side elevation disclosing some of the ways in which the device may be mounted on a vehicle, parts being in section.

In carrying out the invention, there is provided a tapered lamp body 1. The body 1 has a spherical boss 29 at its rear end. A gripping band 15 extends around the lamp body 1.

The spherical boss 29 at the rear end of the lamp body 1 is engaged in one end of a two-part clamp 34, the constituent members of which are held together intermediately by a tightening device 35, such as a screw. In the opposite end of the clamp 34 is held a spherical boss 36 at one end of a hollow post 37. In order to maintain the lamp body 1 in a horizontal position, and to prevent the lamp body from sagging, a link 38 is provided, the link being equipped at one end with a hook engaged detachably in an opening in the post 37, the link being equipped at its opposite end with a hook engaged detachably with a projection 39 on the gripping band 15.

At the end remote from the clamp 34, the post 37 has a spherical boss 40 engaged in one end of a clamp 41, constructed like the clamp 34, the members of the clamp 41 being held together by a tightening device 42. In the opposite end of the clamp 41 is received a spherical boss 43 at one end of a standard 44 whereon a jaw 45 is threaded. A jaw 46 is mounted to slide on the standard 44, under the impulse of a nut 47 threaded on the standard. Between the jaws 45 and 46 is gripped any desired part of the bumper 48 of an auto 49.

The post 37 may be disposed in a depending position, as shown in solid line in Fig. 3, and under such circumstances the lamp body 1 will be located close to the ground. Figure 3 shows in dotted line that the clamp 41 and the post 37, together with associated parts, may be so placed as to elevate and retract the lamp body 1. Moreover, as shown in Fig. 1, in dotted line, the lamp body 1 may be so positioned as to cast light backwardly, thereby facilitating repairs at the intermediate or rear portion of the car. The clamps 34 and 41, together with the post 37, give the lamp body 1 a practical universality of adjustment, a four-fold ball and socket joint construction being provided, as Fig. 3 will make manifest.

The device forming the subject matter of this application is so constructed that it will consummate the objects set forth in the opening portion of this specification, and a car driver will find many uses for the device, other than those set forth hereinbefore.

What is claimed is:

In a lamp support for a vehicle having a bumper, an upright standard, means for mounting the standard upon and within the bumper, a depending post located without the bumper, an upper clamp normally resting on the bumper, the upper end of the post and the upper end of the standard on the one hand, and the ends of the upper clamp on the other hand, being provided with interengaged ball and socket elements, a forwardly-presented lamp, a lower clamp, the lower end of the post and the rear end of the lamp on the one hand, and the ends of the lower clamp on the other hand, being provided with interengaged ball and socket elements, and a link having detachable and pivotal connections, at its ends, with the lamp in spaced relation to the lower clamp, and with the post in the vicinity of the upper clamp, thereby to secure changes in the direction of light ray projection from the lamp when the lower clamp and the post are knuckled with respect to each other.

HARRY E. POWELL.